March 5, 1946.    W. M. SCOTT, JR    2,396,131
BUS BAR SUPPORT
Filed Oct. 16, 1942    6 Sheets-Sheet 1

INVENTOR.
William M. Scott, Jr.
BY
ATTORNEY

March 5, 1946.  W. M. SCOTT, JR  2,396,131
BUS BAR SUPPORT
Filed Oct. 16, 1942  6 Sheets-Sheet 2

INVENTOR.
William M. Scott, Jr.
BY
ATTORNEY

March 5, 1946.　　　W. M. SCOTT, JR　　　2,396,131
BUS BAR SUPPORT
Filed Oct. 16, 1942　　　6 Sheets-Sheet 3
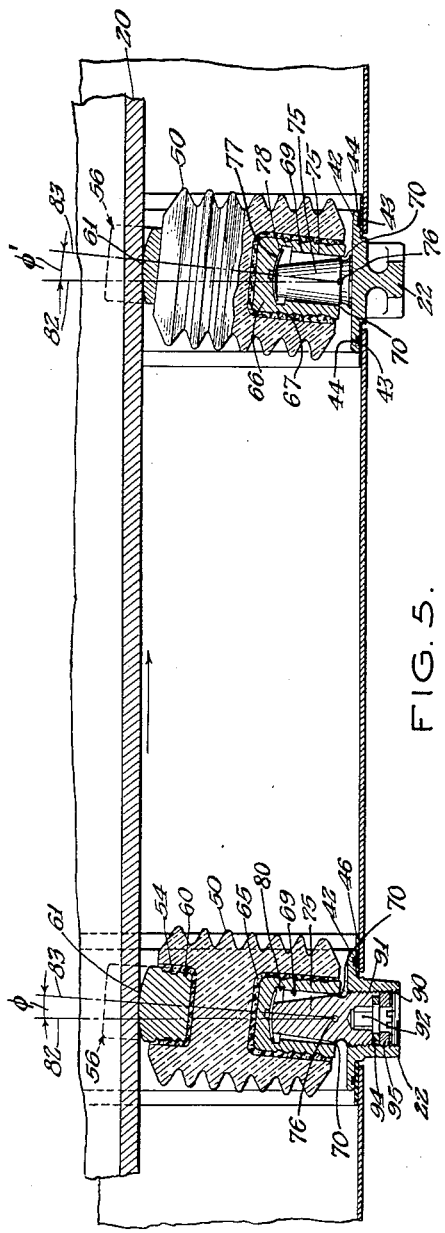
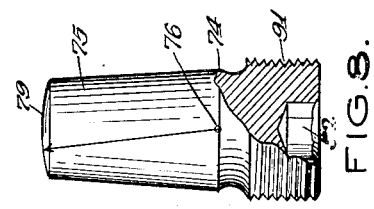
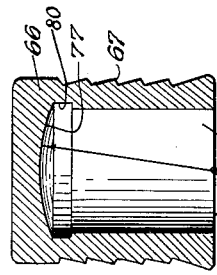
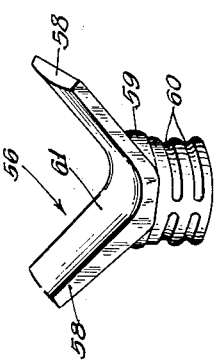
INVENTOR.
William M. Scott, Jr.
BY
ATTORNEY March 5, 1946.    W. M. SCOTT, JR    2,396,131
BUS BAR SUPPORT
Filed Oct. 16, 1942    6 Sheets-Sheet 4

INVENTOR.
William M. Scott, Jr.
BY
Samuel Ostrolenk
ATTORNEY

March 5, 1946. W. M. SCOTT, JR 2,396,131
BUS BAR SUPPORT
Filed Oct. 16, 1942 6 Sheets-Sheet 5
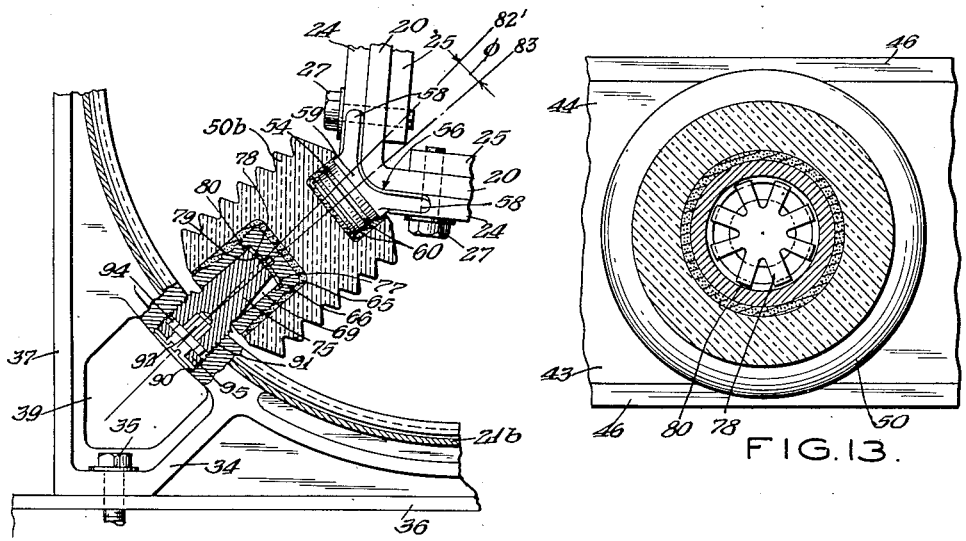
FIG.12.  FIG.13.
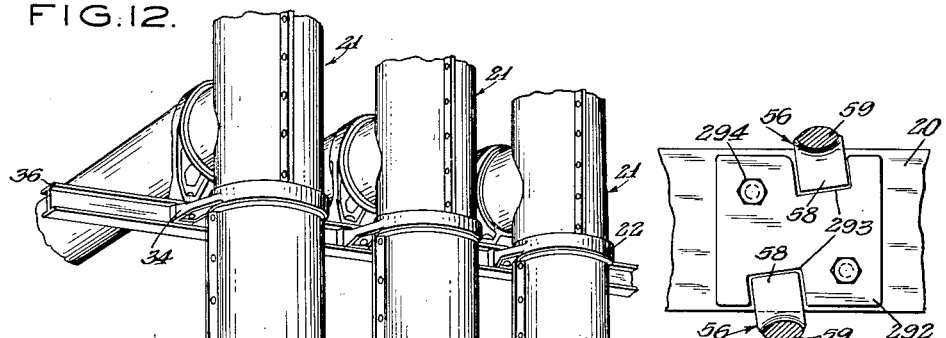
FIG.14-A.
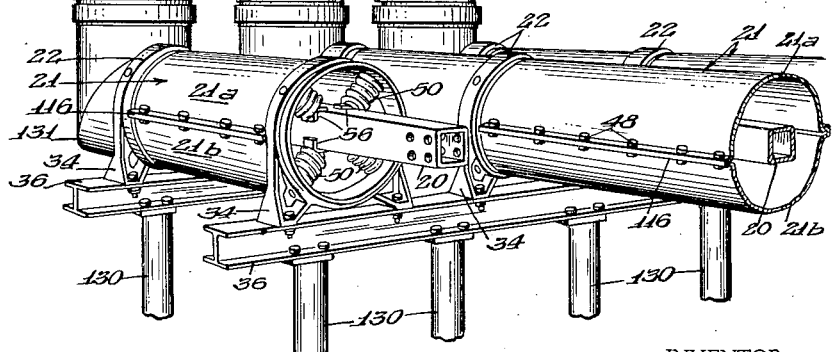
FIG.14.
INVENTOR.
William M. Scott Jr.
BY
ATTORNEY March 5, 1946.   W. M. SCOTT, JR   2,396,131
BUS BAR SUPPORT
Filed Oct. 16, 1942   6 Sheets-Sheet 6

INVENTOR.
William M. Scott, Jr.
BY Samuel Ostrolenk
ATTORNEY

Patented Mar. 5, 1946

2,396,131

UNITED STATES PATENT OFFICE 2,396,131

BUS BAR SUPPORT

William M. Scott, Jr., Bryn Mawr, Pa., assignor to I. T. E. Circuit Breaker Company, Philadelphia, Pa., a corporation of Pennsylvania Application October 16, 1942, Serial No. 462,237

10 Claims. (Cl. 174—99)

My invention relates to novel apparatus for and methods of supporting bus bars mounted within a housing, and more particularly to supports which readily adjust themselves to permit both transverse and axial movement of the bus bar with respect to the housing.

In the mounting of bus bars on supports, such as enclosures, considerable difficulties have been experienced due to the contraction and expansion of the bus bars by reason of the heat generated by the load carried thereby. As the bus bar expands and contracts, it slides with respect to its supporting insulators setting up a shearing action through the cantilever formed through the insulator.

Inasmuch as the insulators are of a ceramic composition, they are less able to withstand such shearing action than the compressive load to which they are normally subjected by the bus bar. It is accordingly desirable that the insulator mounting or supports be so arranged that the insulators are at all times subjected solely to a compressive force and that any tendency toward a shearing action be reduced to a minimum.

I have discovered a novel pivotal mounting of an insulator which permits the insulator to rock in a universal joint so that it may follow the expansion and contraction of the bus bars and remain continuously under compression by the bus bar.

In originally mounting the bus bars on their insulating supports, it is desirable that mechanical irregularities in the housing or supports be readily compensated so as to permit easy mounting of the bus bars.

My novel bus bar mounting with its universal ball and socket effect which permits adjustments not only axially along the longitudinal axis of the bus bar but also permits movement of the insulating supporting members transverse of the longitudinal axis, provides a simple expedient for compensating for such structural irregularities.

Accordingly, a primary object of my invention is to provide in connection with an electrical bus system, novel pivoted bus supporting members that are capable of withstanding and indeed permitting transverse adjusting movement and axial expansion and contraction of the buses to which modern bus systems are subjected, without permitting the buses to be detached from their supports.

Since the insulated mountings useful for this purpose are of relatively brittle and uncompressible ceramic material, distortion of the body of the insulator itself cannot be utilized for this purpose. Accordingly, another object of the present invention is the mounting of a ceramic insulating member between a supporting structure and a bus bar in such manner as to permit a change in the angle which the axis of the insulator assumes with respect to the longitudinal axis of the bus bar.

Still another object of my invention is the provision of means in connection with the mounting of the ceramic insulator whereby, irrespective of the angle which the axis of the insulator may assume with respect to the support and the bus bar during conditions which may ordinarily be expected to arise, the only forces to be exerted on the insulator will be compressive forces which the insulator is primarily designed to withstand.

An additional object of my invention is, therefore, also the substantial avoidance of shearing or bending forces on the insulating supports for my bus bar system.

Another object which is related to the foregoing is the provision of a bus bar carrying saddle on a ceramic insulator, the surface of said saddle being curved transversely in such a manner that irrespective of the angle which the insulator and its saddle assumes with respect to the axis of the bus bar, the saddle, nevertheless, engages the bus bar along a relatively narrow line.

Still another object of my invention is the provision of novel enclosing means for my bus bar system whereby each of the bus bars is individually enclosed in a substantially air-tight housing, the said enclosing means being supported by the principal supporting means or frame which carries the insulating members which in turn position the bus bar.

Another object of my invention is the provision of novel anchoring means for fixedly supporting a selected portion of each bus bar section; and the novel arrangement of my bus bar supports to provide such an anchor.

These and many other objects will become apparent in the following description and drawings, in which:

Figure 5 is a cross-sectional view corresponding to that of Figure 3 showing, however, the shifting of the axis of the insulator supports in response to longitudinal expansion of the bus bar.

Figure 6 is a view in perspective showing the saddle element of the ceramic insulating support.

Figure 7 is a cross-sectional view showing the cylindrical metal bearing sleeve for the tapered stud of Figure 8; the view is an enlargement of a portion of Figures 5 and 2.

Figure 8 is a view partly in cross-section and partly in elevation of the supporting stud of Figures 2 and 5.

Figure 12 is a cross-sectional view corresponding to the members shown at the lower left hand corner of Figure 2 showing, however, the movement of the ceramic insulating support corresponding with an adjustment of the bus bar other than a straight longitudinal expansion thereof.

Figure 13 is a cross-sectional view taken on line 13—13 of Figure 2 looking in the direction of the arrows and showing the formation of the spring washer at the base of the cylindrical bore.

Figure 14 is a partial view in perspective showing the manner in which a bus bar insulator of my invention may be installed.

Figure 14A is a plan view showing an additional locking plate arranged to secure the pivoted bus supports of Figure 9 in anchoring position.

Figure 1:
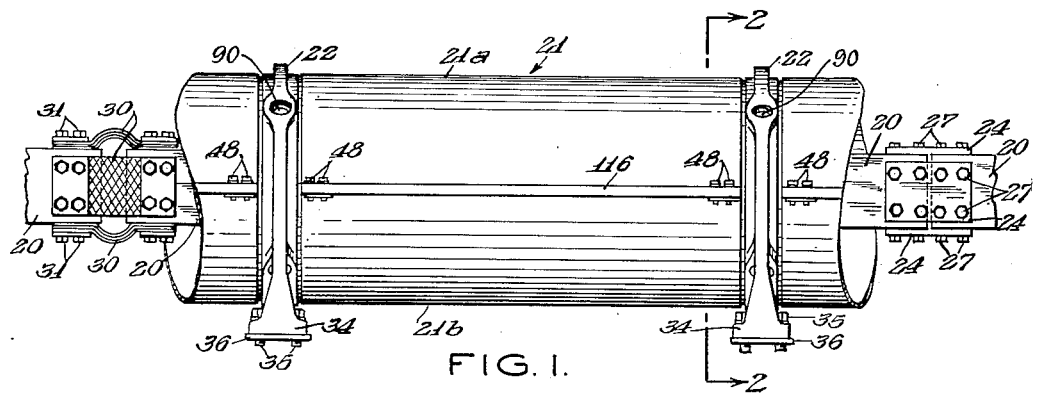
Figure 1 is a view in elevation partly broken away showing the housing and frame supporting members for the bus bar.

Referring now to Figure 1, I have here shown a substantially rectangular bus bar 20 supported within a housing 21 carried by a plurality of main frames 22, 22. The frame members 22 serve not only as a support for the housing 21 but also as a means for securely engaging the bus bar 20 and for suspending or securing the same in any desired manner from any supporting structure.

The bus bar 20 of Figure 1, as has above been pointed out, is here shown as rectangular in shape (although it may be circular or may have any other symmetrical shape appropriate to the particular system in which it is used) and consists of a plurality of lengths of hollow rectangular copper tubing of sufficient cross-sectional thickness to carry the desired current. These lengths may be joined together in any suitable manner as, for instance, by the joining plates 24, 24 which extend from bus bar to bus bar and are secured thereto by the bolts 27.

Figure 2:
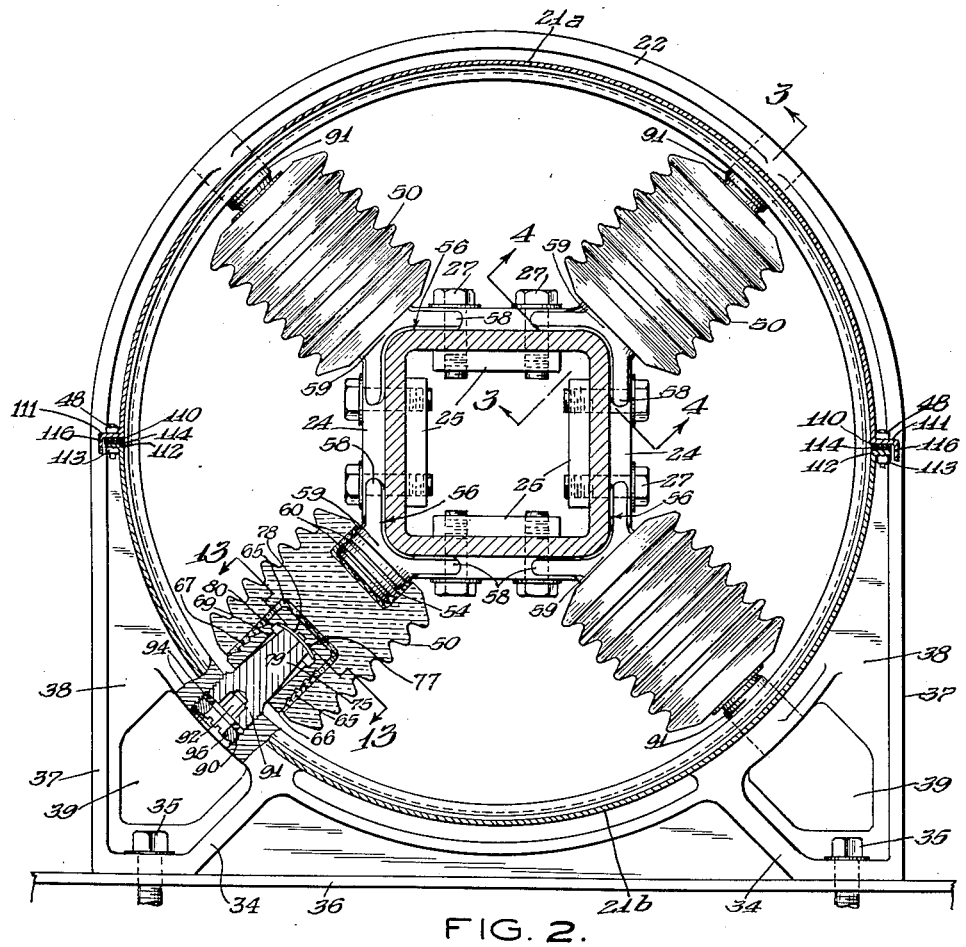
Figure 2 is a cross-sectional view taken on line 2—2 of Figure 1, looking in the direction of the arrows, showing the details of the supporting frame and of the ceramic supporting insulators.

As may readily be seen in Figure 2, the bolts 27 pass through openings in the plates 24 and through corresponding openings in the bus bar and then into tapped openings in the plates 25.

At varying distances throughout the bus bars, flexible or expansion joints are required in order to maintain connections between the sections as they expand and contract. Accordingly, as shown in the left-hand end of Figure 1, a flexible connection between adjacent sections of the bus bar 20 may be provided by means of the flexible connecting members 30 secured to adjacent portions of the adjacent bus bars in any suitable manner as, for instance, by the bolts 31. These flexible connecting members may be in the form of braided wire or may consist of flexible laminated material, as shown, of sufficient thickness to carry the full load.

The supporting frame 22 (Figure 2) itself is of a non-magnetic material, preferably bronze, and is provided with a pair of opposite legs 34, 34, preferably integral therewith, and which may be secured by the bolts 35 to the main frame or support 36 of the bus bar system.

The legs 34 may be of any form suitable for appropriate mechanical support and may, for instance, consist of a supporting section 37 having a cross-section substantially equal to or greater than the frame member 22 and a connecting web 38 further integrating it with the frame member.

The web 38 is provided with cut-outs 39, 39 to permit the securing and positioning studs hereinafter mentioned to be inserted.

Figure 3:
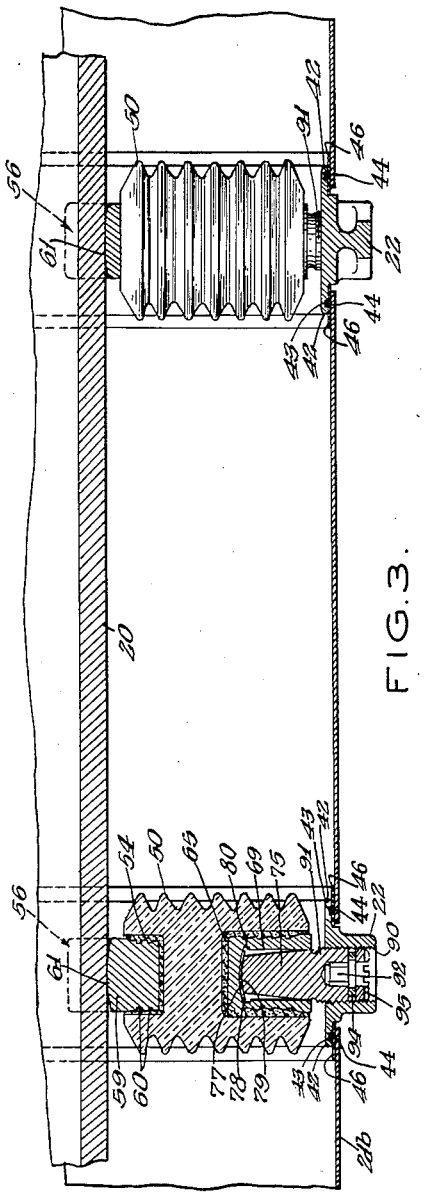
Figure 3 is a cross-sectional view taken on line 3—3 of Figure 2 looking in the direction of the arrows.

In Figures 2 and 3 it will readily be seen that the frame member 22 is an annular relatively ring-like member which completely surrounds the bus bar. The frame members 22 are mounted on the support 36 at suitably spaced intervals in accordance with the structural stresses which may be expected on the bus bar and in accordance, therefore, with the optimum intervals of support which should be provided therefor.

These frames, it should be emphasized, serve not only as a plurality of spaced supports for the bus bar structure, but also as frames upon which the enclosing housing structure for the bus bar may be mounted in the manner hereinafter pointed out.

Each of the circular frame members 22 is, as is more readily seen in Figure 3, provided with annular flanges 42 extending on either side thereof for supporting the enclosing structure or housing 21. Each of the flanges 42 is circumferentially grooved on opposite sides at 43, 43, and packing rings 44, 44 are inserted therein.

The housing 21 between each pair of circular frame members 22 consists of two sections (as is more readily seen in Figures 1 and 2). Each of these two sections (21a and 21b) is semi-circular in shape and is of a length which permits it to span the distance between the adjacent flanges 42, 42 on adjacent supporting frames 22 and to rest on these flanges.

After the packing rings 44, 44 are inserted in the annular grooves 43, 43 of the flanges 42, a fibre insulating strip 46 is wrapped around each of the flanges 42 over the packing material, and the two housing sections 21a and 21b are positioned in place. The housing sections are then secured together on opposite sides by means of the bolts 48, 48 in a manner hereinafter more specifically described, and an air tight enclosure is thus provided.

Referring again specifically to Figures 2 and 3, it will here be seen that the bus bar is carried by a plurality of ceramic insulating supports 50, 50, each of which is pivotally mounted. In other words, each of these members is so arranged that it may yield slightly or be moved in order to prevent substantially unrestrained transverse or axial movement of the bus bar 20; the former being necessary for adjustments of the bus bar with respect to the supporting frame and the latter being caused by contraction and expansion of the bus bar due to the heat generated therein as the load comes on and off.

For purposes of the following description, the top of the insulator will be that portion of the insulator 50 which is adjacent to and in supporting contact with the bus bar 20. The bottom of the insulator is that portion of the insulator which is adjacent and in supporting engagement with the circular frame supporting member 22.

The top of the insulating member 50, as is seen in Figures 2 and 3, is hollowed out to provide a well 54; and a bronze saddle 56 (see also Figure 6) is cemented into this well. The saddle consists of a bifurcated member having a pair of tines 58, 58 arranged at such an angle that they will fit and support the corner of the bus bar.

The tines 58, 58 of the saddle 56 of Figure 6 are shown at a substantial angle to each other. This formation is followed in order to accommodate for the shape of the bus bar shown in Figure 2. Where a bus bar of a different cross sectional shape is used as, for instance, a circular bus bar, then the supporting face of the saddle will be circular in order to accommodate that particular shape.

The saddle 56 has, as is again seen in Figure 6, a cylindrical extension 59, so that the saddle as a whole is Y shaped. The extension 59, is circumferentially grooved as at 60, and is placed in the well 54, and securely cemented therein. The circumferential grooving, as will be obvious, assists in forming a more secure bond between the saddle and the material of the ceramic insulator 50.

As will again more specifically be seen in Figures 3 and 6, the supporting surface of the saddle 56 has a convex curved bearing face 61 throughout its entire extent. This transverse curve is so arranged that the line on the surface of the bus bar itself, which is transverse to the axis of the bus bar, and which is in contact with the saddle surface, will be tangential to the convex curve of the surface 61. The radius of the convex curve of the saddle surface 61 extends from surface 61 to an imaginary center at 76 (Figures 5 and 7) about which the insulator rocks and determines the curvature of surface 61 so as to maintain a line along the tines 58 in line contact with the bus bar for all positions of the insulator.

Thus, even though the ceramic insulator 50 may be tilted, as shown in Fig. 5, so that it is no longer at right angles to the axis of the bus bar, nevertheless, the contact between the saddle face and the bus bar itself will be over a single relatively narrow line rather than over the entire surface area of the saddle. Thus, when the insulator 50 is tilted owing to the various changes which may occur in the bus bar in the manner hereinafter pointed out, instead of cantilever tensions producing a shearing force which may otherwise occur if the saddle surface were flat and flush against the bus bar over its entire extent, a compressive force from the line of contact along the radius through its center is applied to the insulator, as will be explained more fully hereinafter.

The opposite end of the insulator 50, or the bottom thereof, is also hollowed out to form the well 65 (Figures 2, 3, and 5), and is provided with a steel bearing sleeve 66 which is inserted therein (see also Figure 7 which shows a cross sectional view of the steel bearing sleeve alone). Here again, the steel bearing sleeve 66 is circumferentially grooved as at 67 so that when it is cemented into the well 65, a secure bond is formed between it and the material of the insulator. The bearing sleeve 66 is provided with a substantially cylindrical opening 69.

The inner end of the cylindrical opening 69 has a curved seat 77 which is part of a sphere having its center at 76 substantially in the center of the mouth 71 of the opening 69. As is seen more particularly in Figures 2 and 13, a spring washer 78 is nested in this seat 77 and forms a bearing surface for the rounded end 79 of the tapered stud 75 (Figures 2 and 8). A reentrant groove 80 (Figures 2 and 7) is milled into the bottom of the cylindrical bore 69, in order to provide a retaining element for the spring washer 78. To insert the spring washer 78, its slotted circumferential parts are slightly flexed to permit entry into the opening 69 and it is pushed inward until it seats itself in groove 80.

The stud 75, as may readily be seen in Figures 2 and 8, is a tapered stud. The inner end 79, which is in engagement with the spring washer 78, has a curved surface (Fig. 8) similar to the surface of seat 77 (Fig. 7) so as to permit insulator 50 and its seat portion 77 and washer 78 to slide over the surface 79. The opposite end 74 (Fig. 8) of the tapered portion of stud 75 has a cross sectional diameter substantially equal to that of the cylindrical bore 69, so that when the stud 75 is inserted in the bore 69, the circumferential edge 74 of the tapered portion is engaged by a circumferential line of the bore 69 as at 70 (Fig. 5) about which the insulator may rock as a pivot.

Thus, since the rounded portion 74 of the stud 75 registers at 70 with the mouth 71 of the cylindrical bore 69, these elements cooperate at this point to form what is substantially equivalent to a ball and socket joint.

Since the stud 75 is progressively tapered inwardly while the cylindrical bore 69 remains substantially of the same diameter throughout so that at the innermost end of the cylinder the diameter of the stud is substantially less than that of the cylinder, it will thus be obvious that the ceramic insulator 50 may rock on this ball and socket joint in any desired direction with respect to the stud 75. This motion, of course, will be through portions of a sphere whose center is at point 76. In this motion, the surface 77 and spring washer 78 as its wipes over surface 79 will move over a portion of a sphere whose center is at 76 and whose radius extends from this surface to 76. Similarly, surface 61 will move over a portion of a sphere whose center is at 76 and whose radius is from surface 61 to center 76.

The tapered studs 75 in which the insulators 50 are pivotally supported are each individually adjustable and individually insertable with respect to each of the insulators 50, so as to appropriately position these numbers initially when the bus bar supporting system is first assembled, as will be explained more fully hereinafter.

In the construction here shown, four tapped openings 90 are provided in each of the annular supporting frame members 22; each of these openings being 90° apart (see Figures 1, 2, and 3).

The bottom end of the stud 75 is threaded at 91 (Figs. 2, 5 and 8) and is provided with an hexagonal bore 92. Thus, an ordinary socket wrench may be used to insert each stud 75 into the tapped opening 90, and to screw the same outwardly or inwardly to correspondingly adjust the relative position of the spherical end 79 (in engagement with the spherical seat 77) with respect to the frame 22. This produces a corresponding adjustment of the relative position of the ball and socket joint formed by the engagement of the rounded portion 74 with the mouth 71 of the cylindrical bore 69, and this in turn determines the relative position of the bus bar 20 with respect to its housing. When the stud 75 has been properly positioned, a lock washer 94 is screwed into the tapped opening 90 and is pulled up tight against the end of the stud 75 by the lock nut 95.

The operation and assembly of my novel bus bar assembly will now be clear. At each of the rings 22, four studs 75 are screwed into the threaded openings 90 until they assume their approximate final position. Where the bus bar extends horizontally, the two lower insulators 50 are then slipped over their individual studs 91. These two insulators are thus temporarily supported by their studs. The two upper insulators are then slipped over their respective studs and while thus temporarily held from dropping out, the bus bar 20 is slipped into position in the saddles 59 of the four insulators.

Where the bus bars are vertical, all the insulators 50 are mounted and self supported on their respective studs 75 until the bus bar is moved into position on the saddles. Thereafter, adjustments are effected as described below.

After the insulators and the bus bar are positioned, as described above, it is next necessary to as closely as possible center the bus bar with respect to the housing. All or any number of four studs 75 may be screwed inwardly or outwardly, as the case may be, thus correspondingly shifting the insulators and with them the bus bar with respect to its housing.

In the final position of the bus bar, all of the studs have been positioned so that their inner faces 79 are in contact with the spring 78, and through this washer press against the inner face 77 of the insulator. In this final position, the insulators will, by reason of the ball and socket pivot which permits the insulator to rock in all directions, compensate for any irregularities in the bus bar housing by rocking on their pivots. The spring washer 78 also aids in maintaining a tight contact even though there are irregularities in curvature.

When adjustments are completed with the studs 75 in final position locked by nuts 95, the insulators 50 are under compression by the bus bar through a line of force extending from the line of contact of the bus bar with the saddle 58 along radial lines through the center 76. As will be shown, this compression force remains along such radial lines as the bus bar expands and contracts.

In Figures 2 and 3 the position of the insulator is shown wherein no distortion of any kind has taken place, and the axis of the insulator is normal to the axis of the bus bar and parallel to and coinciding with the radius of the frame 22 and the axis of the stud 75.

In Figure 5, the shifting of the insulators 50 is shown in accordance with a longitudinal expansion of the bus bar.

With reference to Figures 3 and 5, the bus bar 20 should be regarded as anchored to a stationary support at some distance to the left of these figures.

Here the insulator to the left is nearest the position at which the bus bar has been anchored. There has, therefore, been less expansion of the bus bar at this point, due to heat generated by the load, than at the bus bar to the right.

As a result of the expansion of the bus bar, both insulators have been rocked on their respective pivots at 74, each saddle 61 rocking with and in the direction of the bus bar movement. There has, therefore, been no frictional sliding at the saddle and no corresponding shearing action, as has been the case with insulators heretofore.

Due to the fact that the insulator rocks and the surface 61 of the saddle is transversely rounded so that the only contact of the saddle with the bus bar is along a tangential line, the bus bar compression shifts along the line of contact of the saddle with the bus bar and along a radial line through the center 76.

The center of rotation of the insulator is at point 76, previously described, which is at the center of the mouth 71 of the cylindrical bore 69 and which is the center on which the spherical bearing surface 77 at the base of the cylindrical bore 69 has been generated. The principal axis 83 of the insulator when extended should pass through this point (Figure 5).

The central curve of the surface 61 of the saddle 56 between the tines 58, 58 thereof is also, as described, curved on a radius generated from the point 76. The remainder of the surface 61 is transversely curved on a series of curves of equal radii, each tangentially in contact with the bus; so that with the insulator 50 tilted at any angle between its limits, an imaginary line 82 drawn through the insulator and normal to the bus bar 20 at the point of tangency of the surface 61 of the saddle thereto passes through the imaginary point 76. This line is at an angle $\phi$ to the line 83 through the axis of the support. Line 82 in the right insulator 50 is at a greater angle $\phi'$ to the axial line 83.

Thus, since the curved surfaces (61, 79, and 77), between which the insulator is compressed, are generated from the same center, a true engagement may be obtained at all rounded members in any position of the insulator. The insulator is thus allowed freedom of play to follow the movements of the bus bar; and the only force exerted upon the insulator in the expanded or contracted position of the bus bar is a compressive force whose resultant passes through the center of rotation of the insulator. There is, therefore, no shearing force through the saddle which tends to crack or split the insulator, as has heretofore been the case.

This, as explained hereinbefore, is also true with respect to any positioning or movement of the bus bar (owing to unavoidable defects in assembly or to shift or settling of the main supporting frame) which results in a transverse displacement as well as in a simple longitudinal expansion or contraction thereof as in Figure 12 where the bus bar 20 has been shown in transverse displacement.

Since the engagement between the rounded portion 79 of the stud 75 and the mouth 71 of the cylindrical bore 69 in the insulator is in effect a ball and socket engagement, the insulator of Figure 12 may rotate in any direction to compensate for any movement. Thus, even though the bus bar has been shifted transversely, the insulator 50b may tilt to accommodate for this effective shortening of the spacing between the bus bar and the frame and thereby prevent the insulator from being destroyed by shearing action.

When the bus bar thus moves downwardly tending to compress the insulator 50b, this downward movement moves the insulator 50b so that the principal axis of support shifts from the main axis of the insulator again to the imaginary axis 82', which is at an angle $\phi$ thereto.

The degree to which the insulator may resist such distortional effect is, of course, again determined by the degree of taper of the stud 75.

As the insulator rocks on its pivot, the surface 77 slips through its washer 78 on the surface 79 of the plug 75 thus producing a shearing action on the plug. Since, however, the plug may be of bronze and the leverage arm from these sliding surfaces to the center 73 is comparatively small, this decreased shearing action on the plug is of lesser importance.

The taper of the stud 75 and the spacing of the various insulators from the anchoring support of the bus bar should be such that maximum shift of the bus bar at any insulator preferably should not be greater than the degree of rotation permitted to that insulator by the taper of the stud 75.

Should readjustment of the insulating support with respect to the bus bar be desired, it is necessary only to loosen the lock nut and the lock washer in each of the openings in the annular supporting frame 22, and then to appropriately adjust each of the studs 75. When the proper adjustment has been made, the respective lock nuts and lock washers may be tightened once more and the system, at least with respect to that particular section, is ready for operation.

The transverse curve 61 in the saddle 66 is of great importance in the operation of my bus supporting structure. If, for any reason, the bus bar 20 is strained in an off-center direction, the force is taken up by a corresponding motion of an insulator, as in Figures 5 and 12, or of several of the insulators in their respective ball and socket joints.

Figure 4:
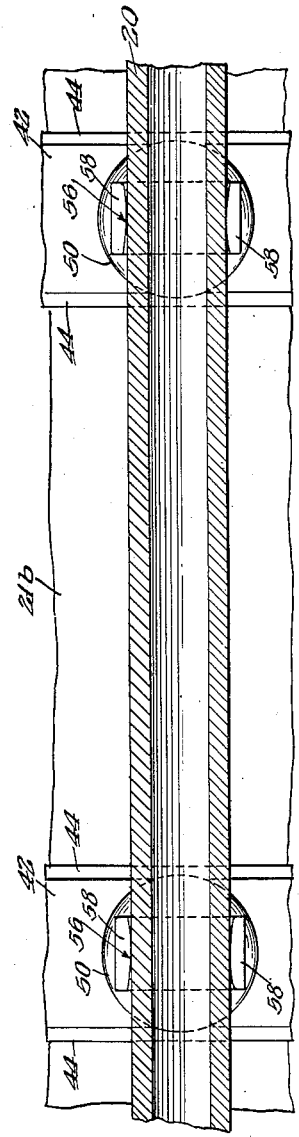
Figure 4 is a cross-sectional view partly in elevation taken on line 4—4 of Figure 2 and looking in the direction of the arrows.

By constructing the saddle (as in Figures 2, 4 and 6) so as to form a single line tangential bearing against the bus bar irrespective of the axial relation between the bus bar and its insulating support, the stresses set up between adjacent bus bars are resolved into compression stresses as much as possible through the insulator supports.

Where a relatively flat bearing surface was provided for the insulator saddle, then, when the insulator was moved at an angle other than normal to the axis of the bus bar, the forces set up by the distortion of the bus would tend to shear the saddle out of the insulator and eventually crack the porcelain.

As has already been stated, in order to localize expansion and contraction of the bus bar, they are sectionalized and each section is anchored at one point thereof.

My insulating supporting members are of such a nature that they may also be used to provide such an anchoring support for the bus bar to prevent any movement of the bus bar at the point required.

I have found it preferable to anchor the center portion of any particular length of bus bar. By this means, the expansion on either side of the anchoring point will be substantially less than if the bus bar were anchored at or adjacent to one end thereof; in which latter case, the cumulative expansion at the end opposite the anchoring point would be so great as to make it difficult or impossible to utilize substantial lengths in bus bar construction.

Anchoring elements of this type have taken many forms. I have found, however, that my isulating supporting members 50 in cooperation with the supporting circular frame 22 may be utilized by an appropriate adjustment thereof to provide an anchoring support.

Figure 9:
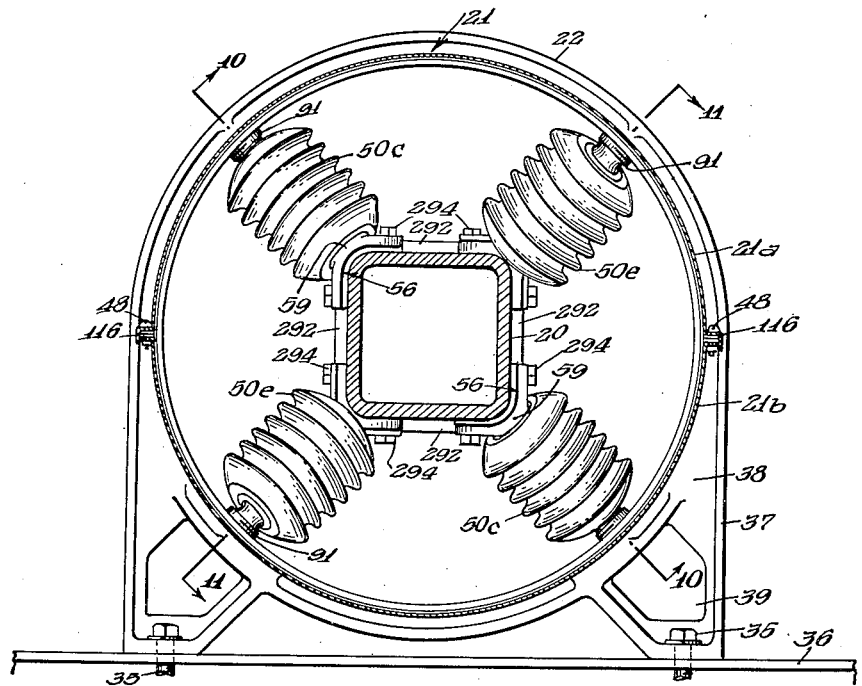
Figure 9 is a cross-sectional view corresponding somewhat to that of Figure 2, but showing the arrangement of the ceramic supporting members at angles to each other for the purpose of anchoring the portion of the bus bar supported thereby.
Figures 10, 11:
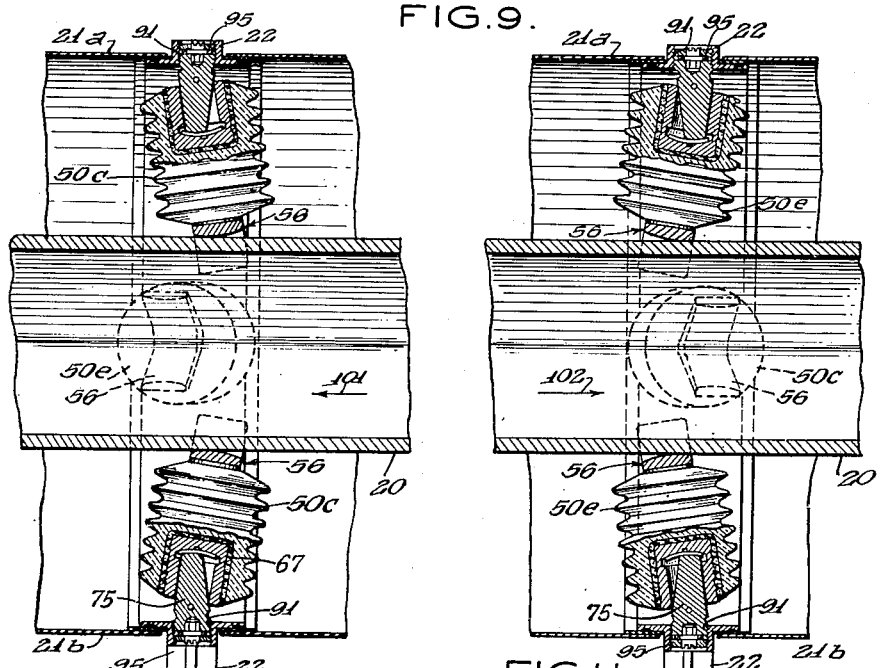
Figure 10 is a cross-sectional view taken on line 10—10 of Figure 9.
Figure 11 is a cross-sectional view taken on line 11—11 of Figure 9.

This type of adjustment is more clearly shown in Figures 9, 10 and 11.

While ordinarily in the construction of my bus bar, the insulating supporting members 50 are adjusted throughout so that their axes are initially normal to the axis of the bus bar in order to provide for the adjustment features above described, nevertheless, should I desire to use the same insulating members as an anchoring support for the middle section or any other portion of my bus bar, the only difference in the adjustment is that the insulating members are adjusted so that their axes at their anchoring point are at an angle to the longitudinal axis of the bus bar.

As above pointed out in connection with the prior descriptions and drawings, the optimum method of supporting my bus bar is by the utilization of four insulating supports 90° apart at each supporting point.

At the anchoring point, pairs of opposite insulating supports are tilted in opposite directions in order to provide an effective anchor.

The insulating supports of Figures 9, 10 and 11 are first inserted adjacent the supporting frame 22, and in engagement with the bus bar 20, and the studs 75 are then threaded through the tapped openings 90 so that the tapered portions thereof engage in the cylindrical bores of the insulating supports. Then, each insulator 50 is manually rocked in a plane parallel to the axis of the bus bar and in the desired direction to obtain the fullest possible tilt of the axis thereof with respect to the longitudinal axis of the bus bar (with the side of the stud bearing against the side of the socket). The stud 75 is then driven further inwardly until it can be rotated no further, at which time, therefore, the insulating support 50 at that point is frictionally held in the tilted position.

As seen in Figures 9, 10, and 11, the opposite insulating supports 50c, 50c are thus tilted in one direction and the set of opposite insulating supports 50e, 50e are tilted in the opposite direction.

The clockwise tilt of the lower insulator 50c (Figure 10) is such that the tapered side at the left of its stud 75, is in contact with the inside wall of the opening or well so that the insulator is not free to rock any further in a clockwise direction or in the direction of its tilt. This is also true of the upper insulator 50c. Therefore, the only direction in which the bus bar can move without slipping on the saddle 56 is in the direction of arrow 101 of Fig. 10.

Similarly, the opposite pair of insulators 50e are tilted to their maximum position in the opposite direction, as shown in Fig. 11. In this position, the bus bar can only move in the opposite direction 102 without slipping on the insulators 50e due to the engagement of the right side of their studs in contact with the walls of the opening.

Thus insulators 50c block movement of the bus bar in the diretcion opposite to the arrow 101 in Figure 10 and insulators 50e block movement of the bus bar in the direction opposite to the arrow 102 in Figure 11, thereby anchoring the bus bar in position.

In order to decrease the possibility of the bus bar slipping on the insulator, the stud 75 is screwed inwardly as far as possible to provide a tight frictional engagement of the saddle with the bus bar.

In order to still further insure against slip movement of the bus bar, I provide an additional anchor plate 292 which may be used to ensure that the bus supports of Figure 9 will be positively maintained in anchoring position (see Figures 9 and 14A). The plate 292 is secured to the bus surface in any suitable manner as by the bolts 294 inserted in tapped opening in the bus. Cutouts or slots 293 are provided in plate 292 to receive the tines 58 of saddles 56 of the bus supports. These slots are so spaced that they will register with the portions of the saddles extending over the surface of the bus to which the plate is attached. Since, as previously described in connection with Figures 9–11, opposite insulators are pivoted toward the same point, adjacent supports are pivoted toward staggered points (see particularly Figures 10 and 11). Therefore, the saddle members extending over a single bus surface will extend on opposite sides of the center of plate 292. Consequently, slots or cut-outs 293 also extend on opposite sides of the center of plate 292 and are arranged to receive the saddles of tilted bus supports. Since, as seen in Figure 9, the plate 292 is of substantial thickness (preferably approximately equal in thickness to that of the tines of the saddles), the sides of slots 293 furnish bearing surfaces which prevent movement of the saddles and hence of the bus supports out of anchoring position.

Any other suitable anchoring means may, of course, be used without departing from the spirit of that portion of my invention which relates to the support of the bus bar in such manner that supporting members may yield to expanding, contracting, or distorting forces without destruction of the support itself. However, the supporting members of my invention may, without any variation in the form thereof, be readily adapted, as shown in Figures 9, 10 and 11, to anchor a portion of the bus bar against movement.

Figure 17:
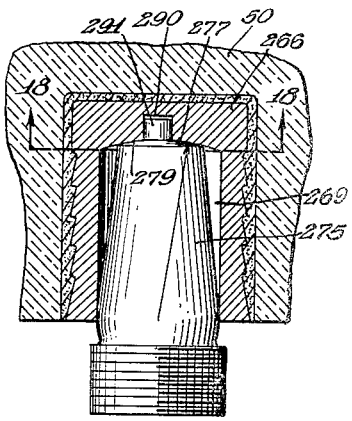
Figure 17 is a cross-sectional view showing still another modification of the pivotal support for the bus bar insulator, this specific modification being peculiarly adapted for use in connection with the anchoring insulators shown in Figures 9 to 11.
Figures 18, 19, 20:
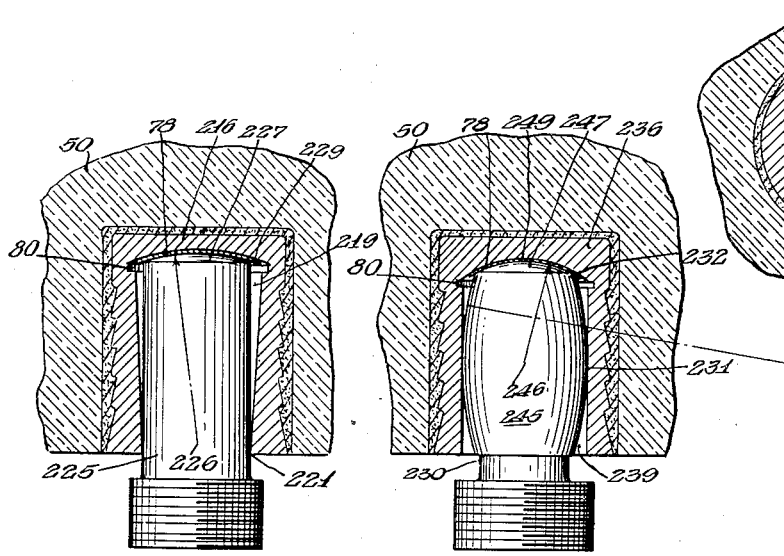
Figure 18 is a cross-sectional view taken on line 18—18 of Figure 17 looking in the direction of the arrows.
Figure 19 is a cross-sectional view showing another modification of the pivotal or rotatable support for the bus bar insulator.
Figure 20 is a cross-sectional view showing another modification of the pivotal support for the bus bar.

In Figures 17 and 18 I have shown a variation in the formation of the end of the stud and the base of the socket which is most useful where the insulator is to be used as an anchoring element as shown in Figures 9 to 11. Where the insulator is to be used as such an anchoring element in the manner previously described, it is important that the insulator should not be permitted to rotate or slip.

As previously described, it cannot rotate because the tilt of the insulator is at its maximum tilt position. This, therefore, ensures that the insulators when tilted, as shown in Figures 9 to 11, will act as anchoring elements. This anchoring is therefore dependent on tilting the supporting insulators to their maximum tilting position. The construction of the studs of Figures 17 and 18 is designed to avoid the necessity for such tilting of the anchoring insulators.

Thus in Figure 17, the anchoring insulator 50 is provided with a socket member 266 having the opening or well 269. The base 277 of this opening or well is provided with a longitudinal slot 290 (Figures 17 and 18).

This longitudinal slot is disposed in a direction parallel to that in which the tines of the saddle at the opposite end extend. The tapered stud 275 has the same form as the stud 75 with the exception that from the curved end 279 thereof extends a pin 291 centrally located with respect thereto. The diameter of this pin is such that the pin may snugly enter into the slot and be confined in its movement therein to movement only in a longitudinal direction of the slot, as shown in Figure 18.

In other respects the socket member 266 and the stud 275 are similar in operation and function to the socket and stud elements of Figures 7 and 8. Instead of having a universally pivotal movement, the socket 266 and its insulator member 50 are confined so that they can rotate about the stud in a single plane, only, limited by the engagement of the pin 291 in the slot 290. This pivotal movement in a single plane is such as to permit the insulator to swing transversely of the longitudinal axis of the bus bar but not along the longitudinal axis of the bus bar. Therefore, the insulator, while it may tilt to correct for constructional variations of the bus bar, cannot move in the direction of expansions or contractions of the bus bar. The bus bar may, therefore, be anchored by insulator 50 of Figure 17 against such longitudinal movement thereof.

In actual operation the insulator is positioned so that its saddle engages the bus bar. The slot 290 at the opposite end thereof extends, as has been pointed out now, in a direction normal to the axis of the insulator in which the tines of the saddle extend and hence extend in the direction in which the insulator must be swung while assuming the anchoring position. The stud is then inserted as previously described, the pin 291 thereof entering into the slot 290. The insulator may, if necessary, be tilted to correct for mechanical variants and is then in appropriate anchoring position. When the insulator is properly in place, then the stud is rotated inwardly as far as it will go, thus firmly securing the insulator in the selected anchor position. The insulator may not now rock longitudinally out of this position. In this position, the bus bar can only slip with respect to its insulator support. In order to prevent any slipping of the bus bar, the insulator may now be locked in place by a plate similar to that shown in Figure 14A.

By the utilization of this type of socket and stud formation in the construction of Figures 9 to 11, a firm anchor is therefore secured by means of tilted insulators.

Inasmuch as the tension exerted at the anchor is the maximum for that particular section of bus bar, the tendency for a shearing action here at the anchor is greatest. This shearing action is, as described above, a cantilever tension exerted on the furthermost portion of the insulator from the origin of the force. The side of the insulator closer to the origin of the force in turn is under compression forces.

In order to overcome this torsional or shearing force, the insulator may be placed under an excessive compressive load. In such a case the compressive forces are in opposite directions to and tend to counterbalance the tensional forces. This is effected in the present case by screwing the studs in so tightly that a very firm grip is applied by the bus bar to the insulator, placing the insulator under compressive forces. Any external compressive forces on the insulator may function in the same manner to counteract the tension of the bus bar so that the net shearing force at the anchor is either materially decreased or even entirely wiped out.

In Figures 1 to 8 I have shown a rotatable or pivotal support for my bus bar insulator which is produced by the insertion of the stud element of Figure 8 into the socket element of Figure 7.

In the construction of these elements it is now obvious that the tapering of the stud 75 cooperating with the true cylindrical form of the opening 69 in the socket formation, combined with other elements as above pointed out, produces the universally rotatable support for the bus bar insulator. Such universally rotatable support may be obtained by similar structures having slightly variant forms.

Figure 15:
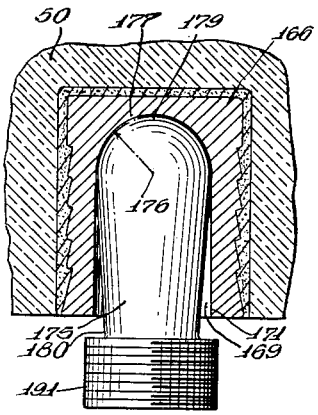
Figure 15 is a cross-sectional view corresponding to the lower left-hand corner of Figure 2, showing a variation in the rotatable support for the bus bar insulator.

Thus, in Figure 15, I have shown a stud 175 received in the opening 169 of a socket element 166 which is embodied in a manner previously described in the body of the insulator 50.

The stud 175, as will be obvious, tapers outwardly from the threaded base 191 thereof so that it is narrower adjacent its base and wider at its spherical end 179. The inner end 177 of the opening 169 is also formed as a portion of a sphere corresponding exactly to the end 179 of the stud 175.

Since the stud 175 is tapered outwardly so that its neck 180 is narrower than the mouth 171 of the opening 169 in the socket and since the end 179 of the stud and the base 177 of the socket are spherical, the stud has a universally rotative movement in the socket.

This movement is limited by the difference between the diameter of the mouth 171 of the opening 169 and the diameter of the neck 180 of the stud. When the stud has been rotated so that its side wall becomes parallel along any line with the side wall of the opening 169 and is contiguous therewith, then the limit of movement is reached, as was previously explained in connection with Figures 2 to 8.

The stud of Figure 15 is therefore as rotatable in its socket as the stud of Figures 2 to 8. The only difference in operation which is obtained by this construction is that the center of rotation of the insulator in which the socket 166 is embedded is no longer in the center of the mouth of the opening in the socket but is located at point 176 adjacent the end 179 of the stud. This movement of the center of rotation 176 toward the saddle end of the bus insulator changes the degree of curvature of the various elements. It will be obvious, as has been previously pointed out, that the curvature of the end of the tapered stud and of the base of the socket must be generated around the center of rotation of the bus insulator as a center.

In this case, since this center of rotation 176 is moved closer to these curvatures, these curves become more pronounced (compare Figures 15 with Figures 7 and 8). Since the center of rotation 176 is also thereby moved closer to the saddle member at the opposite end of the bus insulator, the transverse curvature of the surface of the saddle becomes also more pronounced. Each saddle may thus more readily rotate with respect to the bus bar as the bus bar expands and contracts. This is so, since the more pronounced transverse curvature of the saddle further ensures the straight line bearing contact between the saddle and the bus bar which was previously described.

Figure 16:
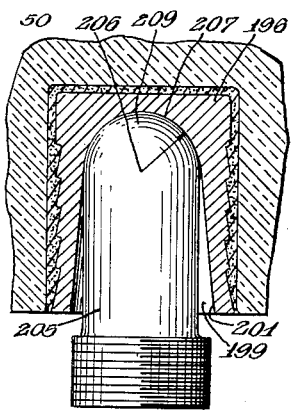
Figure 16 is a cross-sectional view showing another modification of the rotatable support for the bus bar insulator.

In Figure 16 I have shown another variation in the stud and socket supporting arrangement. Here, as contrasted with Figures 15 and 8, the stud member 205 is not tapered at all but is of straight cylindrical shape while the walls of the opening 199 of the socket 196 are tapered outwardly from the curved base 207 of the socket.

The end 209 of the stud 205 is spherically curved, the said curve being generated from the point 206 as the center. Obviously, the base 207 of the socket is similarly curved. Here the stud may have a universally rotative movement in the socket owing to the greater diameter of the mouth 201 of the opening 199 as contrasted with the diameter of the stud 205.

Here, also, owing to the fact that the center of rotation 206 is moved inwardly closer to the base part, all the curves generated around this point may be more pronounced and thus may have all of the attributes previously described in connection with Figure 15.

In Figure 19 I have shown a modification of the construction of Figures 7 and 8 wherein the interior formation of the socket and stud elements is exactly reversed from that of Figures 7 and 8.

Here the stud 225 is an untapered cylinder, whereas the interior of the opening 219 of the socket 216 is tapered outwardly toward its base. Thus the diameter of the mouth 221 of the opening 219 is substantially equal to the diameter of the stud 225, being only sufficiently greater to permit the stud 225 to enter therein.

The base 229 of the socket is, as will be obvious, substantially wider than the base 227 of the stud 225. The interior taper of the opening 219 is sufficiently sharp so that there is only a line contact between the mouth 221 of the socket and the periphery of the stud 225, thus permitting the stud to rotate universally with respect to the socket. In this formation the periphery of the base of the opening 219 may be milled at 80 to provide a seat for the spring washer 78, as described in connection with Figures 2 to 8 and 13.

The center of rotation 226 of the stud should, because of the formation of the stud and socket elements be substantially at the mouth 221 of the socket or displaced only slightly inwardly therefrom to permit further rotation of the stud within the socket. Here the stud may rotate with respect to the socket until a longitudinal line along the socket is brought into contact with a longitudinal line of the stud, when rotation is limited.

In all of the examples above noted, it will be obvious, of course, that it is the socket element and the insulator 50 carried thereby which rotates with respect to the stud. In the foregoing description wherever the stud is described as rotating, this is set forth in order to simplify the description itself. The stud, it will be understood, is always stationary and the socket and insulator rotate with respect thereto.

In this construction the centers of curvature of the end of the stud, of the base of the socket and of the saddle are taken from the point 226 and consequently, the curves are substantially of the same degree as those of Figures 2 to 8 and are not as pronounced as is the case in Figures 15 and 16.

In Figure 20 I have shown a modified stud 245 which may be used in connection with a slightly modified form of socket member 236. Here the opening 239 in the socket 236 is a straight untapered cylinder having a spherical curved base 249. The stud 245 is barrel-shaped, being narrower at the neck 230, curving to its widest point substantially at its center 231 and narrower once more adjacent its base at 232. The end 247 of the stud is spherically curved to coact with the spherically curved base 249 of the opening 239.

The base of the opening in the socket is also milled at 80 to receive and support the spring washer 78. Here the contact between the stud 245 and the wall of the opening 239 is substantially along the central portion 231 of the periphery of the stud and the stud may swing around the central point 246 which coincides with the widest peripheral diameter 231 of the stud. Here, since the center of curvature 246 is approximately midway between the ends of the stud, the curves 247 and 249 and hence the transverse curve of the saddle carried by the insulator 50 are more pronounced than is the case in Figure 19 and in Figures 2 to 8. However, these curves are less pronounced than those which obtain in connection with Figures 15 and 16.

The advantage of the barrel-shaped formation of the stud 245 of Figure 20 is that limiting contact lines which limit the degree of rotation of the insulator with respect to the stud are always on opposite sides of the stud.

Thus, when, for instance, the insulator 50 swings to the right with respect to Figure 20, its motion is limited by contact of the lowest and outermost right-hand portion of the socket wall with the lowest and outermost right-hand portion of the stud and at the same time is limited by contact of the uppermost and innermost left-hand portion of the socket with the similar portion of the stud on the opposite side, thus tending to balance the torsional forces on the stud itself.

Each of the modifications of Figures 15, 16, 19 and 20 represents formations which may be advantageously used in special cases. The preferred form which has been found most useful, however, is that shown in Figures 2 to 8.

When rather abnormal expansion is to be offset, the greater curvatures permitted by the construction of Figure 20 may be most useful. Where excessively abnormal expansions of the bus bar are to be expected, then the formations of Figures 15 and 16 may be most useful since they permit the transverse curvature of the saddle on a shorter radius, thus providing for abnormal transverse curve of the saddle and ensuring a single line contact with the bus bar and easy rotation of the saddle.

The form of Figure 19 may be useful where a stronger stud is desired but is slightly more difficult in manufacture, owing to the reverse taper of the interior of the socket.

The semi-cylindrical housing structures 21a and 21b are, as has previously been pointed out, supported on the annular flanges 42 of the annular supporting frame members 22. Each section is of sufficient length to span the distance between adjacent annular supporting frames and to rest on the annular flanges thereof. The housing sections 21a and 21b are preferably formed of non-magnetic metallic material. They are formed in semi-cylindrical sections which are to be bolted together, so that they may readily be removed in order to permit inspection of the bus bar and its supporting elements.

As was previously pointed out, the joint between the housing element 21 and the annular flange frame 22 is packed with appropriate gaskets in order to provide a substantially air-tight construction.

Likewise, the longitudinal joints 110, 110 (Figure 2) are so arranged as to afford a substantially perfect seal.

Each of the upper sections 21a is provided with a longitudinal flange 111 on either side. Each of the lower sections 21b is likewise provided with a longitudinal flange 112. A lug 113 may be secured to the lower flange 112 by welding or in any other suitable manner.

A packing material 114 is provided between the flanges 111 and 112 on each side. The bolt 48 is then passed through corresponding openings in each of the flanges 111 and 112, and in the packing material 114 and the lugs 113. The openings in the lugs 113 may be threaded to avoid the necessity for the use of nuts; or, in fact, the necessity for using the lugs 113 may be obviated entirely and nuts may be substituted therefor.

The tightening of the bolts 48 thus affords an efficient seal along the longitudinal seams 110. In order further to protect this longitudinal seam, the upper flanges 111 may be turned down as at 116, thus further covering the seams.

It will be obvious that any type of enclosing or housing elements may be utilized in connection with the frame insulator supports herein described, and, likewise, that variations in the type of the support for the insulator itself may be used.

While it is preferred, for instance, that for purposes of economy and strength in construction, the frame insulator supports be circular, under certain conditions, it may be possible or desirable to make these elements rectangular, or give them any other polygonal form.

Moreover, while for purposes of illustrating the action of the insulators, my invention has been illustrated in connection with housings, it will be understood that my invention may be used with the insulators mounted on any structural supporting elements.

The essential element from the point of view of the insulator supports is to provide a supporting means for the tapered studs 75 in order to provide a bearing against which the insulator elements 50 may rest.

While I prefer that four insulating supports 50 be used at each point in order to carry my bus bar, it should be obvious that one, two, three or more such insulator supports may be used at any one point. Thus, for instance, in appropriate cases, two such insulating supports may be used at one supporting point, and two other insulating supports extending along an axis 180° removed from the axis of the first set of insulating supports may be used at another supporting point.

Again, it is pointed out, however, that the preferable construction is that shown in Figures 2 and 14 wherein four such insulators are used at each supporting point, thus providing optimum support for the bus bar to obtain optimum adjustability of the supporting members to expansions and contractions.

In Figure 14, I have shown in a somewhat schematic perspective view, the manner in which my bus bar system supported by the members of my invention and enclosed by my housing, above described, may be mounted on the supports 36. Here the supporting members 36 are shown as I beams which are carried in any suitable manner on risers 130. The supporting I beams 36 are spaced in such manner as to receive and support the legs 34 of the annular supporting frame members 22.

I have found that the angle formed by the corners 131 of the housing are sufficiently strong to support themselves without requiring any special support at the corners or joints. Likewise, the angle formed by two bus bar lengths at this joint is self-supporting. Therefore, no other supporting members are necessary at these corners.

It should be understood that the view of Figure 14 illustrates simply one way in which a commercial embodiment of my invention may be formed and that my supporting members may, of course, be used in many other ways to provide an adequate adjustable and flexible support for the bus bar not only with respect to housings but with respect to any supporting structure.

In each case, however, the essence of my invention is the arrangement of the insulator supports so that irrespective of any expanded, contracted, or off-center position which the bus bar itself may assume, an appropriate insulating support for the bus bar is, however, provided. And in order to protect the insulator support against cracking or other failure owing to the mechanical strain set up by such distortion, my invention provides for the impingement of the distorting force upon each insulated support in such manner that it is at all times subject substantially only to compression and a minimum of shearing forces are applied.

Although I have indicated in the foregoing the possibility of different variations of my invention, many other embodiments thereof should now be obvious to those skilled in the art. I prefer, therefore, to be bound not by the specific disclosures herein but only by the scope of the appended claims.

I claim:

1. An insulator for supporting electrical conductors in a housing having a socket in one end thereof and a member secured to said housing inserted in said socket for supporting said insulator from said housing, said insulator being movable with respect to said member, said member in the extreme movement of said insulator engaging the side walls of the socket, the seat of said socket having the shape of a section of a sphere and the contacting face of said member in engagement with said surface having a corresponding curve.

2. An insulator for electrical conductors having a socket in one end thereof and a member inserted in said socket, said insulator being pivotal with respect to said member, said insulator having a saddle secured thereto at the opposite end thereof for receiving a bus, said saddle having the center of its bus carrying surface transversely curved on an arc having a center coinciding with the center of rotation of the insulator; all other portions of the saddle surface being transversely curved on arcs of equal radii.

3. An insulator having a saddle secured thereto for receiving a bus, said saddle having the center of its bus carrying surface transversely convexly curved on an arc having a radius the prolongation of which will intersect the axis of the bus; all other portions of the saddle surface being transversely curved on arcs of equal radii.

4. In combination, a bus bar, a supporting member, an insulator for maintaining said bus bar in spaced relation with respect to said supporting member, said insulator being curved at the end engaging said bus bar and forming a tangential line of engagement with said bus bar, means for pivotally supporting the other end of said insulator on said supporting member, the center of curvature of said pivotal support also being the center of the curvature of the central curved portion of said insulator.

5. In combination, a bus bar, a supporting member, an insulator for maintaining said bus bar in spaced relation with respect to said supporting member, said insulator being convexly curved at the end engaging said bus bar, and forming a tangential line of engagement with said bus bar, means for pivotally supporting said insulator on said support, the center of curvature of said pivotal support being the center of curvature of the central convex curve of the first mentioned end of the insulator.

6. In combination, a bus bar, a supporting member, an insulator for maintaining said bus bar in spaced relation with respect to said supporting member, said insulator being curved at the end engaging said bus bar, and forming a tangential line of engagement with said bus bar, the other end of said insulator having a socket for receiving a stud fixedly mounted on said supporting member, the engaging faces of said stud and socket being portions of arcs formed on the same center as the central portion of the curved opposite end of said insulator in engagement with said bus bar.

7. In combination, a bus bar, a supporting member, an insulator for maintaining said bus bar in spaced relation with respect to said supporting member, said insulator being curved at the end engaging said bus bar, and forming a tangential line of engagement with said bus bar, the opposite end of said insulator having a socket for receiving a stud fixedly secured to said supporting member, the engaging surfaces of said stud and socket forming portions of a sphere whose center is the same center as the central portion of the curvature formed at the first mentioned end of said insulator.

8. In combination, a bus bar, a supporting member, an insulator for maintaining said bus bar in spaced relation with respect to said supporting member, said insulator being curved at the end engaging said bus bar, and forming a tangential line of engagement with said bus bar, the other end of said insulator having a socket for receiving a stud fixedly mounted on said supporting member, the engaging faces of said stud and socket being portions of arcs formed on the same center as the central portion of the curved opposite end of said insulator, said stud being in pivotal engagement with said socket along the circumferential line of said socket.

9. In combination, a bus bar, a supporting structure therefor, an insulator interposed between said structure and bus bar for maintaining said bus bar in spaced relation with respect to said structure, means for pivotally supporting one end of said insulator to said housing to permit said insulator to be rocked about a predetermined center, and insulator supporting means secured to the other end of said insulator, said supporting means being in tangential engagement with the bus bar, whereby as the bus bar moves axially, the insulator rocks on its pivoted support as said insulator supporting means maintains tangential connection with the bus bar.

10. In combination, a housing, a bus bar enclosed in said housing, a plurality of insulators angularly spaced from each other for maintaining said bus bar in spaced relation within said housing, means for pivotally supporting one end of one of said insulators for permitting the free angular movement of said insulator, means for supporting the other end of said insulator along a tangential line, said tangential contact being maintained as said bus bar moves axially, whereby said insulator is constantly under substantially only compressive forces between said bus bar and housing.

WILLIAM M. SCOTT, JR.